Figure 1:
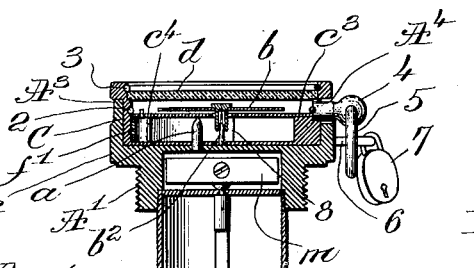

M. MARTIN.
FLUID GAGE.
APPLICATION FILED APR. 13, 1907.

903,213.

Patented Nov. 10, 1908.

Witnesses:
Thomas J. Drummond
Joseph M. Ward

Inventor
Morris Martin,
by Henry __ attys.

UNITED STATES PATENT OFFICE.

MORRIS MARTIN, OF BOSTON, MASSACHUSETTS.

FLUID-GAGE.

No. 903,213.          Specification of Letters Patent.          Patented Nov. 10, 1908.

Application filed April 13, 1907. Serial No. 368,050.

*To all whom it may concern:*

Be it known that I, MORRIS MARTIN, a citizen of the United States, residing in Boston, county of Suffolk, and State of Massachusetts, have invented an Improvement in Fluid-Gages, of which the following description, in connection with the accompanying drawing, is a specification, like letters on the drawing representing like parts.

The invention to be herein described is intended as an improvement on the class of gage represented in United States Patents No. 794,675, and No. 794,676 heretofore granted to me.

In the gages described in said patents, a magnetized needle is controlled as to its movements by a magnet which is rotated by or through a float which rises and falls due to differences of level of fluid in a tank, the magnetized needle being always free to follow the movements of the magnet.

In the use of a gage of this kind, it has been found very desirable to be able to detect whether or not gasolene in the tank to which the gage is applied is tampered with; *i. e.*, abstracted from the tank; and also it is of importance to many owners of automobiles to be able to tell whether or not his car has been used without his consent. Consequently I have invented what I call a detective gage that I shall hereinafter fully describe, the magnetic needle of said gage being readily locked whenever desired. The needle may be locked in the act of detaching the needle carrier from the gage head, and the needle automatically locked is held in just the position in which it was held by the magnet under the control of the float resting on the gasolene at the time when the needle was locked, and when the needle is again unlocked, as it may be when the needle carrier is again applied to the head of the gage, if any change in fluid conditions in the tank has taken place, the magnetic needle, on its release, will immediately be moved into alinement with the magnet and indicate such change, thus immediately showing whether or not the gasolene in the tank has been tampered with, or the machine has been run, and it will be impossible to exhaust part of the gasolene and then refill the tank to meet the exact conditions of the magnetic pointer.

I believe that I am the first to construct a magnetic gage wherein the magnetic needle may be instantly locked and remain locked until released, or a gage wherein the needle-carrying part of the gage may be readily removed from the head of the gage closing the opening into a tank, the act of removing the needle carrier locking the magnetic needle in the position it occupied when controlled by the magnet, and I desire to claim this feature broadly in whatever form, as it will be understood that numerous devices differing in construction may be employed for locking the magnetic needle and yet be within the scope of my invention.

Figure 2:
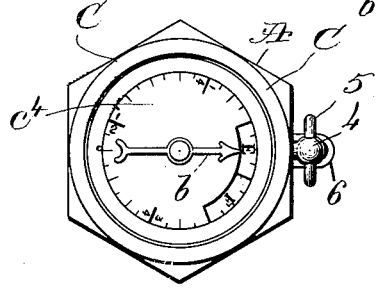
Figure 3:
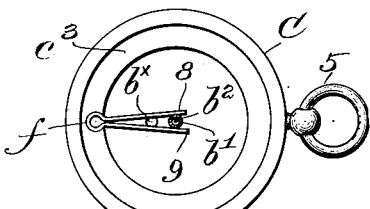
Figure 4:
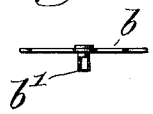
Figure 5:
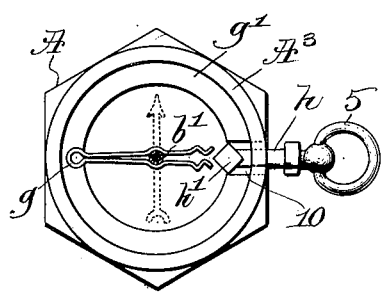
Figure 6:
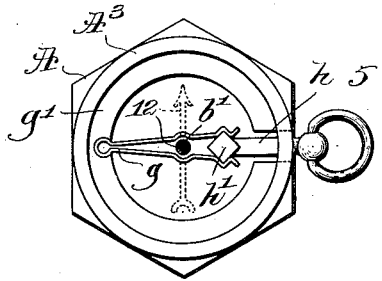
Figure 7:
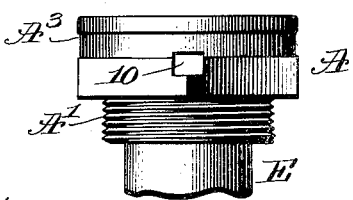
Figure 8:
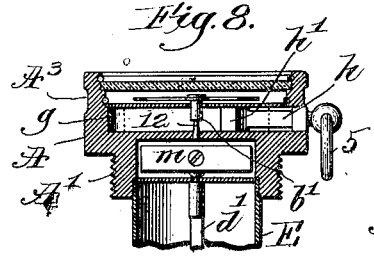

Figure 1 in section represents a gage in which I have embodied my invention in one of the best forms now known to me; Fig. 2 is a plan view of the top of the gage; Fig. 3 is a plan view of the needle carrier with the dial removed; Fig. 4 is a detail of the magnetized needle and its tubular shank; Fig. 5 in plan view shows a modification of my invention with the dial removed and the needle locked; Fig. 6 is a similar view with the needle unlocked; Fig. 7 is a side elevation of the gage head, and Fig. 8 is a section of the head of my modified gage with the dial and needle in plan, the needle being unlocked.

Referring to the drawing, A represents the gage head, the latter in its present form being gas and fluid tight, it having screw threads A' by which to screw the head of the gage into any suitable bushing secured to a tank. The gage head has a rim $A^3$ provided with a slot $A^4$, and rising from the top of the gage head is a releasing device $a$ shown as a pointed stud.

The magnetized needle $b$ has, as shown, a tubular shank $b'$ that is fitted over and surrounds a pivot $b^2$ rising from the bottom of a needle carrier C, the latter, as herein shown, being represented as a metal box having a hole $b^x$ to be entered by the releasing device $a$ of the gage head. The needle carrier when in its operative position is fitted within the rim $A^3$, and at such time the releasing device enters the hole $b^x$ of said carrier. The needle carrier has a shoulder $c^3$ upon which is laid a dial $c^4$ having a central hole for the reception of the tubular shank of the magnetic needle, said shank extended through said hole, as in Fig. 1, embracing the pin $b^2$. The inner wall of the needle holder just above the dial is shown as provided with an annular groove to receive a locking wire or device 2 to maintain the dial in a fixed position. Above the wire for maintaining the dial in its position the carrier has another shoulder upon which is laid a piece of glass $d$, and above the glass the inner wall of the needle carrier is provided with another groove for the reception of a locking ring 3 or wire to maintain the glass in its operative position.

The magnetic needle is free to revolve in the space between the dial and the under side of the glass, and said needle is so revolved as the magnet is rotated as will be described, the arrow head of the magnetic needle moving over the gradations of the dial indicating the amount of gasolene or other fluid in the tank with which the gage is to be used.

The magnet $m$ is mounted upon the upper end of a shaft $d'$ surrounded by a hollow metal float $d^2$ which may be such as fully described in United States Patent No. 794,675, the float resting on the surface of the fluid in the tank and in its rising and falling movements due to variations in the depth of fluid in the tank turning the shaft and magnet.

I have herein shown the shaft as without a twist, and the float as provided with a pin $e$ that may enter a spiral slot in a tube E, as provided for in the patent hereinbefore referred to, but instead of employing a tube with a spiral slot, I may employ a tube with a straight slot, and twist the shaft as in United States Patent No. 794,677 so that as the float rises and falls, the shaft and magnet will be rotated, or instead of the tube I may use any other usual float-guiding means, such as a guide rod or rods. I prefer, however, to use a tube within which the float will rise and fall, yet this invention is not limited to the use of a tube, as the float may be guided in any other usual or customary manner without departing from my invention.

The needle carrier is shown as provided with a stem 4 having a ring 5 such as usually employed in connection with a watch to handle the same, and I contemplate locking the needle carrier in position, if need be, on the head, so that a thief may not remove the needle carrier if an automobile containing the gage should be left in the street. To effect this locking, I extend from the head of the gage a projection 6 provided with a hole over which the ring of the needle carrier is laid, and then insert the hasp of a small padlock 7 in the hole in said projection. The locking device for the needle carrier is shown as comprising a spring $f$ having two fingers 8, 9, said fingers being of a length to cross the pivot sustaining the magnetic needle, and also being so arranged that the releasing device, when the needle carrier is in its operative position, will stand between the two arms of the locking device and hold said device in its inoperative position, leaving the magnetized needle free to be turned by the magnet.

Now viewing Fig. 1, let it be supposed that the owner of a car, or whoever is running the same and has a right to do so, stops his car in a shelter or garage, he will immediately pick off or remove the needle carrier from the head of the gage, and in so doing the locking device will be instantly removed from the releasing device so that the locking device acting normally will immediately close on and grasp the tubular shank of the magnetic needle instantly locking the same in just the position that it occupied due to the holding action of the magnet $m$. The needle carrier may be put in the pocket, and whenever the car is to be again started, the needle carrier will be applied to the head of the gage, and instantly the releasing device will enter between and open the locking device, thus releasing the shank of the magnetic needle so that it will immediately change its position to correspond with the position of the magnet, which as before stated, is always controlled by the quantity of gasolene or other fluid in the tank, if the amount of fluid in the tank differs at all from what was in the tank when the needle carrier was removed. The magnetic needle will instantly turn in one or the other direction to indicate any change in the amount of gasolene or other fluid in the tank.

In Figs. 5 to 8 showing a modification of my invention, I have provided for locking the magnetized needle whenever desired in any position where it may be held by the magnet so that it will not be turned by the magnet while so locked, said means being effective to lock the needle without removing the same from the head of the gage. The locking means in the modification comprises a spring $g$ having two arms, the free ends of which are shaped as best shown in Figs. 5 and 6, one end of the spring being inserted in a recess cut in a shoulder $g'$ inside the curb $A^3$ of the head A. The head has a hole 10 that receives a releasing device shown as a stem $h$ having a head $h'$ and as provided with a ring 5, the releasing device when occupying the position shown in Fig. 6, where the head occupies a position between the free ends of the spring, spreading the spring so as to release the shank $b'$ of the needle it, in the modified construction, fitting loosely a pivot 12 mounted in the head. To lock the needle it is only necessary to withdraw the releasing device from the position shown in Fig. 6 into the position shown in Fig. 5 when the spring acting normally closes itself upon the shank of the needle. If desired, the releasing device may be entirely withdrawn from the head through the hole 10 and put into the pocket to be used when desired.

In using the modification, if the locking device occupies the position shown in Fig. 6, the magnetic needle will obey the magnet and follow the same in all its movements due to variations of gasolene in the tank, and if the car having the gage is put up anywhere over night, or when gasolene conditions are liable to be changed, the releasing device may be wholly withdrawn from the head, thus locking the needle and thereafter if gasolene is removed, or added to the tank, such fact may be readily proven by inserting the releasing devise in the hole 10 far enough to open the spring, thus releasing the needle, which will, in case any change of gasolene has taken place, turn to the position occupied by the magnet. So also, if one is touring and wishes to know the quantity of gasolene used between one village and another, it is only necessary to withdraw the releasing device, as in Fig. 5, permitting the locking device to lock the needle, and when the next place is reached the movement of the releasing device from the position shown in Fig. 5 into the position shown in Fig. 6 will immediately release the needle, letting it turn to the position then occupied by the magnet and the distance over which the needle is moved on the dial will indicate the quantity of gasolene used from one to the other place.

This invention is not limited to the particular shape of the releasing devise as the same may be made in any shape in which keys of Yale and other locks are usually made.

Having described my invention, what I claim as new and desire to secure by Letters Patent is:—

1. A fluid gage comprising a head, a pivotally mounted magnet, a float, operative connections between said float and the magnet whereby the position of the magnet is determined by the fluid level, an indicating magnetic needle revoluble at times in unison with float induced movement of said magnet, means to sustain the needle in the head, and means rendered operative at will to temporarily lock the needle and restrain it from revoluble movement, the magnet remaining free at all times to change its position in accordance with variations in the fluid level.

2. A fluid gage comprising a head, a pivotally mounted magnet, a float, operative connections between said float and the magnet whereby the position of the magnet is determined by the fluid level, an indicating magnetic needle revoluble at times in unison with float induced movement of said magnet, means to sustain the needle in the head, needle locking means operative to lock and restrain the revoluble movement of the needle, and a releasing device to render the needle-locking means inoperative in order that the needle may follow the movement of the magnet.

3. A fluid gage comprising a head, a pivotally mounted magnet, a float, operative connections between said float and magnet whereby the magnet is turned by the movement of the float, a detachable needle carrier having a dial, an indicating magnetic needle revoluble over said dial by the influence of said magnet, and means automatically rendered operative to lock the needle in said carrier on detaching the carrier from the head.

4. A fluid gage comprising a head, a pivotally mounted magnet, a float, operative connections between said float and magnet whereby said magnet is turned by the movement of the float, a detachable needle carrier having a dial, an indicating magnetic needle revoluble over said dial by the influence of said magnet, means to lock the needle in said carrier, and a releasing device sustained by said head and operative to render the locking device inoperative when the carrier is sustained by said head.

5. In a fluid gage, a removable needle carrier provided with a magnetic needle, and a device normally operative to lock the needle, combined with a gage head having a stud, a movable magnet, and means controlled by a fluid to move the magnet more or less, said stud serving to render the locking device inoperative to lock the needle after the needle carrier has been applied to said head.

6. In a fluid gage, a removable needle carrier provided with a magnetic needle, and a device normally operative to lock the needle, combined with a gage head having a stud, a magnet, and means including a float controlled by a fluid to turn the magnet more or less, said stud serving to render the locking device inoperative to lock the needle after the needle carrier has been applied to said head.

7. In a fluid gage, a needle carrier having a needle pivot, and a locking device comprising spring arms, combined with a needle having a tubular shank to surround said pivot, the arms of the locking device normally closing upon and embracing said shank and preventing the rotation of said needle on its pivot, and a needle releasing device adapted when interposed between the arms to spread them and free the shank.

8. In a fluid gage, a head, a magnet, and means to rotate said magnet in said head, combined with a needle carrier having a dial, a magnetic needle above the dial, a pivot for said needle, and a locking device located within the needle carrier below said dial, said needle having a shank extended into the space below said dial, the locking device when operative acting directly on the shank of the magnetic needle extended below the dial to restrain the rotation of said needle.

9. In a fluid gage, a head, a magnet, and means to rotate said magnet, combined with a fixed, centrally apertured dial, a magnetic needle revoluble above the dial by the influence of the magnet and having a tubular shank extended loosely through said dial, a fixed pivot for the needle, locking means located below the dial and coöperating with the depending needle shank to restrain rotation of the needle, and a releasing device to coöperate with and render the locking means inoperative.

10. In a fluid gage, a head, a magnet, and means to rotate said magnet, combined with a fixed dial, a magnetic needle revoluble adjacent thereto by the influence of the magnet, a locking device for the needle, and a carrier for said needle, dial and locking device, detachably mounted on the head, the locking device being automatically rendered operative to lock the needle in the carrier on detaching the carrier from the head, and means to render the locking device inoperative when the carrier is sustained by the head.

In testimony whereof, I have signed my name to this specification, in the presence of two subscribing witnesses.

MORRIS MARTIN.

Witnesses:
GEO. W. GREGORY,
EVANGELINE C. BROWN.